United States Patent
Hugus et al.

(10) Patent No.: US 8,444,786 B2
(45) Date of Patent: May 21, 2013

(54) SOLID COMPOSITE PROPELLANTS AND METHODS OF MAKING PROPELLANTS

(75) Inventors: George D. Hugus, Chuluota, FL (US); Edward W. Sheridan, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 20 days.

(21) Appl. No.: 13/240,584

(22) Filed: Sep. 22, 2011

(65) Prior Publication Data

US 2012/0006186 A1 Jan. 12, 2012

Related U.S. Application Data

(62) Division of application No. 11/649,818, filed on Jan. 5, 2007.

(51) Int. Cl.
*D03D 23/00* (2006.01)
(52) U.S. Cl.
USPC .................................. 149/109.6; 149/19.92
(58) Field of Classification Search
USPC .......................................... 149/19.92, 109.6
See application file for complete search history.

(56) References Cited

U.S. PATENT DOCUMENTS 3,377,955 A * 4/1968 Hodgson ............... 102/289
6,846,372 B1 * 1/2005 Guirguis ............... 149/2
7,278,354 B1 * 10/2007 Langan et al. ........ 102/306

OTHER PUBLICATIONS

Shi, L, Q. et al., "Investigation of the hydrogenation properties of Zr films under unclean plasma conditions," J. Vac. Sci. Technol. A 20(6), pp. 1840-1845, 2002 American Vacuum Society, Nov./Dec. 2002.
Fischer, S. H. et al., "A survey of combustible metals, thermites, and intermetallics for pyrotechnic applications," American Institute of Aeronautics and Astronautics, Inc., AIAA Meeting Papers 96-3018, pp. 1-13, AIAA, ASME, SAE, and ASEE, Joint Propulsion Conference and Exhibit, 32nd Lake Buena Vista, FL, Jul. 1-3, 1996.
Notice of Allowance for U.S. Appl. No. 11/649,818 mailed Jan. 3, 2013, 7 pages.

* cited by examiner

*Primary Examiner* — Aileen B Felton
(74) *Attorney, Agent, or Firm* — Withrow & Terranova, PLLC

(57) ABSTRACT

Solid composite propellants are provided that include a matrix comprising an energetic oxidizer and a binder. A multi-layered reactive thin film is provided in the matrix. The reactive thin film includes metal and inorganic oxidizer. Methods of making the solid composite propellants are also provided.

13 Claims, 1 Drawing Sheet

SOLID COMPOSITE PROPELLANTS AND METHODS OF MAKING PROPELLANTS

BACKGROUND

This application claims the benefit under 35 U.S.C. §120 of the filing date of U.S. patent application Ser. No. 11/649,818, filed Jan. 5, 2007, entitled SOLID COMPOSITE PROPELLANTS AND METHODS OF MAKING PROPELLANTS, the entire content of which is hereby incorporated herein by reference.

A solid propellant contains a solid chemical mixture of fuel and oxidizer for burning. The fuel burns when combined with oxygen to produce hot gas. Solid propellants can be used in rocket motors.

SUMMARY

An exemplary embodiment of a solid composite propellant is provided, which comprises a matrix comprising an energetic oxidizer and a binder; and a multi-layered reactive thin film dispersed in the matrix. The reactive thin film comprises at least a first metal layer and a first inorganic oxidizer layer adjacent the first metal layer.

An exemplary embodiment of a rocket motor is provided, which comprises a combustion chamber; and a solid composite propellant contained in the combustion chamber. The solid composite propellant includes a matrix comprising an energetic oxidizer and a binder; and a multi-layered reactive thin film dispersed in the matrix, the reactive thin film comprising at least a first metal layer and a first inorganic oxidizer layer adjacent the first metal layer.

An exemplary embodiment of a method of making a solid composite propellant is provided, which comprises forming a mixture comprising an energetic oxidizer, a binder and a multi-layered reactive thin film. The reactive thin film comprises at least a first metal layer and a first inorganic oxidizer layer adjacent the first metal layer. The method further comprises solidifying the mixture to form a solid composite propellant comprising the reactive thin film dispersed in a matrix formed by the binder and energetic oxidizer.

DRAWINGS

DETAILED DESCRIPTION

Figure 1:
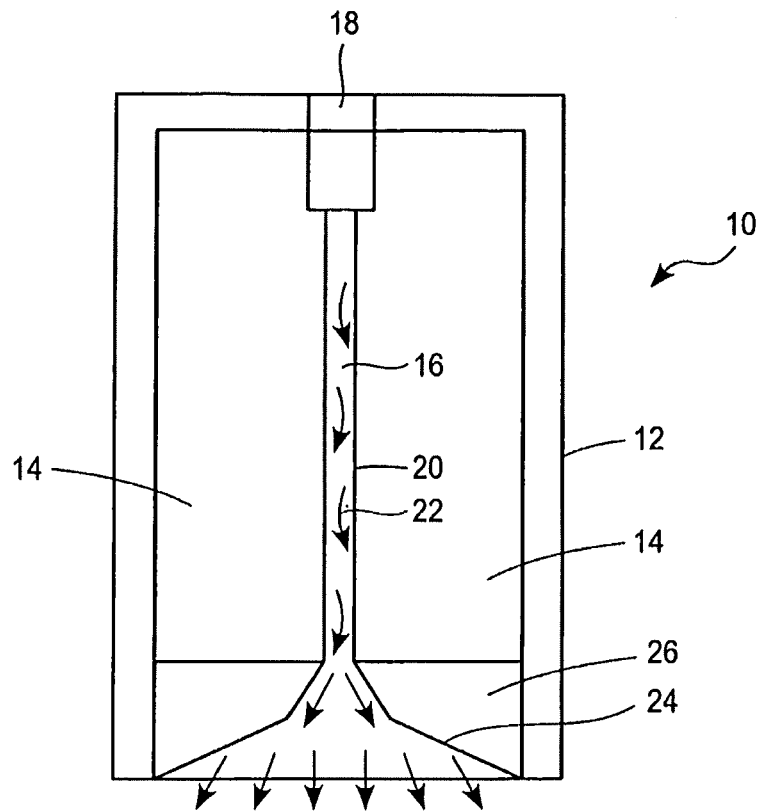
FIG. 1 illustrates an exemplary embodiment of a rocket motor.

FIG. 1 depicts an exemplary embodiment of a solid-fuel or solid-propellant rocket motor 10. As shown, the rocket motor 10 includes a casing 12 containing a solid propellant 14 (also known as a "grain"). A center channel 16 extends longitudinally in the rocket motor 10. The solid propellant 14 is ignited by an ignitor 18. When ignited, the solid propellant 14 burns outwardly from burn surface 20 towards the casing 12. The chemical compounds of the solid propellant 14 burn rapidly and release enthalpic/entropic energy and work-producing, hot gases 22. The hot gases are expelled from a nozzle 24 at the back end of the rocket motor 10. The nozzle 24 is provided in a heat-resistant material 26. The nozzle 24 is configured to increase the thrust provided by the rocket motor 10 by increasing the speed of the exhausted gases 22. The burning of the propellant fuel thus provides energy, and the reaction products of the burning provide the reaction mass.

A solid-propellant rocket motor functions to change the velocity of a rocket or other object that it is provided on. Momentum, p, is given numerically by the product of mass, m, and velocity, v, i.e., p=mv. The amount of change of momentum is known as impulse, I. The performance parameter that is typically used to describe the efficiency and performance of a propellant (reaction mass) is the specific impulse, $I_{sp}$. The specific impulse is numerically given by the impulse, I, produced by the propellant divided by the weight of propellant, $w_p$, i.e., $I_{sp}=I/w_p$. Typically, specific impulse has units of seconds.

The fuel of the solid propellant burns when combined with oxygen to produce gas for propulsion. The oxidizer is the oxygen or oxygen equivalent that is used to burn the fuel. Composite propellants contain a mixture of gas-forming fuel and oxidizer components mixed in a ratio (typically a stoichiometric ratio) to consume the two materials during burning. A high-energy composite propellant can contain a finely-divided metal or metal compound fuel dispersed in a matrix of a gas-forming oxidizer and a binder. In general, a high-energy composite propellant has a relatively greater specific impulse, and a higher efficiency, than a non-high-energy composite propellant due to the energy-dense nature of the fuel. Although high-energy composite propellant formulations can provide a relatively higher specific impulse than such other propellants, factors associated with the kinetics of combustion of metal fuels present engineering challenges with regard to being able to more fully exploit the potential of high-energy propellants.

Particularly, in high-energy propellants, losses can result from incomplete burning of the dispersed metal in the propellant due to molten metal pooling at the propellant surface before metal oxidation can occur, and from physical obstruction of the burning propellant grain surface by coalesced metal, resulting in a lower than anticipated burn-rate. Also, relatively large metal particles ejected from the propellant surface may not react quickly enough with resident oxidizer and, consequently, fuel energy from the propellant can be wasted. Two-phase flow losses can also occur due to limited heat transfer from oxidized metal to the work-producing gas prior to ejection of the gas from the rocket nozzle, and from the presence of relatively large molecular weight particles of oxidized metal in the flow stream that lag in velocity behind the lighter gas molecules. In addition, if the oxidized metal has a tendency to undergo supercooling, an additional energy loss can occur if the heat of fusion released during solidification occurs after the particle has left the nozzle exit plane.

In light of these factors with respect to burning of metal fuels in high-energy propellants, metal-loaded composite propellants are provided that have desirable burn characteristics, including burn rate stability and burn rate. The solid composite propellants include a solid fuel, energetic oxidizer and a binder. Exemplary embodiments of the solid composite propellants can also include one or more optional additives to, e.g., improve processing of the propellants, or to increase the stability of as-processed propellants.

Exemplary embodiments of the solid composite propellant include one or more metal fuels (which are energetically dense materials) to increase the specific impulse supplied by the propellants when used in rocket motors. Exemplary embodiments of the solid composite propellant include reactive thin films (RTF) as at least a portion of the fuel component. The reactive thin films contain metal and inorganic oxidizer. The metal and inorganic oxidizer layers are typically chemically bonded together in the reactive thin films. By incorporating inorganic oxidizer in the reactive thin films, the films have a "self-oxidized" structure.

In some exemplary embodiments of the solid composite propellants, the reactive thin films are the sole fuel source. In other exemplary embodiments of the solid composite propellants, the reactive thin films are combined with an additional fuel. The optional additional fuel can be one or more metal fuel or organic fuel.

The metal layers of the reactive thin films can be composed, e.g., of aluminum, beryllium, zirconium, titanium, boron, magnesium, and combinations thereof. The metal(s) of the metal layers are preferably pure metals.

In the reactive thin films, the inorganic oxidizer can have any suitable composition. For example, the inorganic oxidizer can be at least one oxide selected from the following group: $La_2O_3$, $AgO$, $ThO_2$, $SrO$, $ZrO_2$, $UO_2$, $BaO$, $CeO_2$, $B_2O_3$, $SiO_2$, $V_2O_5$, $Ta_2O_5$, $NiO$, $Ni_2O_3$, $Cr_2O_3$, $MoO_3$, $P_2O5$, $SnO_2$, $WO_2$, $WO_3$, $Fe_3O_4$, $MoO_3$, $NiO$, $CoO$, $Co_3O_4$, $Sb_2O_3$, $PbO$, $Fe_2O_3$, $Bi_2O_3$, $MnO_2$, $Cu_2O$ and $CuO$. Different ones of these oxides can be provided in the same reactive thin film. In other exemplary embodiments, reactive thin films that include different ones of these oxides can be provided in the same propellant.

Exemplary embodiments of the multilayered reactive thin films can include layers of various combinations of metals and inorganic oxidizer materials that are effective to undergo a single reaction, or two or more different reactions, when activated.

The optional additional fuel of exemplary embodiments of the solid composite propellant can be a powder of at least one suitable metal or alloy, such as aluminum, beryllium, zirconium, titanium, boron, magnesium, and alloys and combinations thereof. The one or more metals are preferably pure metals. In exemplary embodiments, the powder particles can be micron sized, e.g., have a maximum dimension of 500 μm or less. Nano-scale powders having a maximum dimension of less than about 500 nm, such as less than about 300 nm or about 100 nm, can also be used. Depending on the composition, method of production, and subsequent processing of the metal powder, the metal powder can have various shapes, including spherical, flake, irregular, cylindrical, combinations thereof, or the like.

The reactive thin films, even when physically broken up into relatively small particles, carry fuel and oxidizer together. These films have a higher energy density (i.e., carry more energy per unit volume) than ordinary gas forming propellants. The reaction products of the reactive thin films are extremely small, and can impart reaction energy more quickly into the work-producing gas than propellants loaded with only a dispersion of metal particles. The smaller the metal fuel reaction product size, the lower the momentum loss on the combustion gas velocity, and the greater the heat transfer from the metal/metal oxide reaction products to the work producing gas.

The optional organic fuel of the solid composite propellant can be a double base, i.e., nitrocellulose and liquid organic nitrate, for example.

The binder that holds together the components of the solid composite propellant can be, e.g., a polymeric binder (i.e., a material that is polymerized to form solid binder), such as polyurethane or polybutadienes (($C_4H_6)_n$), e.g., polybutadiene-acrylic acid (PBAA) or polybutadiene-acrylic acid terpolymer (such as polybutadiene-acrylic acid acrylonitrile (PBAN)); hydroxyl-terminated polybutadiene (HTPB), which can be crosslinked with isophorone diisocyanate; or carboxyl terminated polybutadiene (CTPB). Elastomeric polyesters and polyethers can also be used as binders. The binder is polymerized during rocket motor manufacture to form the matrix that holds the solid propellant components together. The binder is typically also consumed as fuel during burning of the solid composite propellant, which also contributes to overall thrust.

The energetic oxidizer that is contained in the matrix of the solid composite propellant can be selected from perchlorates, chlorates or nitrates, for example. Exemplary oxidizers that can be used in the solid composite propellant include ammonium perchlorate ($ClH_4NO_4$) powder, metal perchlorates, ammonium nitrate and ammonium dinitramide ($NH_4N(NO_2)_2$). Oxygen or halogen in the oxidizer is released during combustion making it available to burn the fuel in the propellant mixture. The oxidizer is typically in powder form to form the propellants. For example, ammonium perchlorate typically has a particle size of about 200 μm to about 400 μm.

Optional stabilizers and processing aids (e.g., catalysts and curing agents) can be added to the solid composite propellant. These optional additives can include dibutyltin dilaurate, calcium stearate, carbon black and starch.

To manufacture a solid rocket motor the components of the solid composite propellant are mixed together in specified ratios and cast into the casing of the rocket motor. The blended material polymerizes and adheres to a surface, typically a liner or insulator, inside of the casing. In the solid composite propellant, the reactive thin film and optional metallic fuel are dispersed (preferably substantially uniformly) throughout the volume of the propellant to provide uniform burning capabilities.

The solid composite propellant preferably has a neutral oxygen balance because the only source of oxygen for combustion is the propellant grain itself. Accordingly, the inclusion of the inorganic oxidizer-containing reactive thin films in the propellant necessitates a corresponding adjustment of the amount of the remaining energetic oxidizer (i.e., the oxidizer that is contained in the propellant matrix) to maintain the overall oxygen balance in the propellant. Because the reactive thin films contain inorganic oxidizer, a 1:1 mass replacement of metal particle fuel with the reactive thin films affects the oxygen balance of the solid composite propellant. To maintain an oxygen balance, the proportion of the energetic oxidizer that forms the matrix in the reactive thin film-loaded, solid composite propellants is adjusted (i.e., decreased).

In exemplary embodiments, the solid composite propellants can contain the following ranges of components (in weight %): polymeric binder: about 5% to about 15%; energetic oxidizer: about 30% to about 85%; reactive thin film: about 1% to about 35%; additional fuel (metallic or organic): 0 to about 35%; and stabilizers and processing aids: 1% to about 5%. In the reactive thin film, the metal and oxidizer components are preferably mixed stoichiometrically with respect to each other.

The multilayered, reactive thin films include layers of metal and inorganic oxidizer that have respective compositions that are effective to burn when ignited by an ignition source. The multi-layered reactive thin films can have micron-sized dimensions, and preferably have nano-sized dimensions. The layers can be chemically bonded. Because the layers of the reactive thin films can have such small dimensions and be chemically bonded to each other, the distance between the metal and inorganic oxidizer can be substantially decreased in the film structures as compared to dispersed metal particles. Consequently, the residence time for a loose metal fuel particle to find available oxidizer before the reactants leave the rocket nozzle can be decreased. Energy can be released more rapidly from the reactive thin film structures when they are activated. The structures can rapidly release a high amount of energy per unit volume of the reactive thin film structures when activated.

Figure 2:
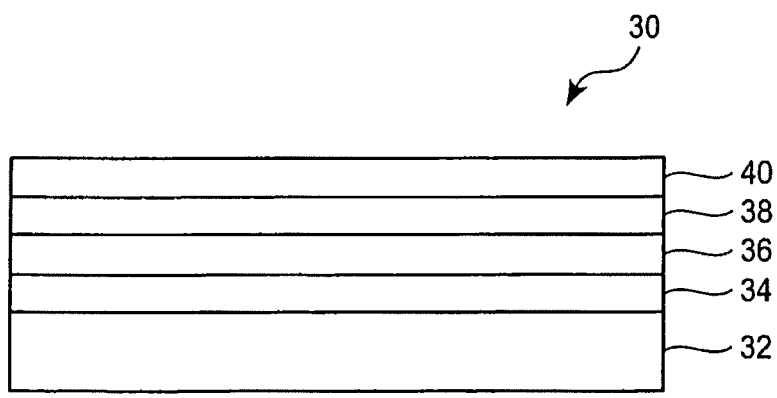
FIG. 2 illustrates and exemplary embodiment of a multi-layered reactive thin film.

FIG. 2 illustrates an exemplary embodiment of a multilayered reactive thin film 30 including a substrate 32, a first metal layer 34 on the substrate 32, a first oxidizer layer 36 of inorganic oxidizer adjacent the first metal layer 34, a second metal layer 38 adjacent the first oxidizer layer 36, and a second oxidizer layer 40 of inorganic oxidizer adjacent the second metal layer 38. Other exemplary embodiments of the reactive thin films can include less than four total layers, e.g., 2 layers, or more than four total layers, e.g., 10, 50, 100, 500, 1000 or more layers.

The arrangement of the metal layers and inorganic oxidizer layers in the reactive thin films is not limited to the particular arrangement shown in FIG. 2. For example, in another exemplary embodiment, an inorganic oxidizer layer can be deposited on a substrate, a metal layer can be deposited adjacent the oxidizer layer, and this alternating layer structure can be repeated to produce a multilayered reactive thin film having the desired total number of layers.

In an exemplary embodiment, the metal and inorganic oxidizer layers of the multilayered reactive thin films can have a total thickness of up to about 100 μm. Individual metal layers and inorganic oxidizer layers of the multilayered reactive thin films can have a thickness of less than about 500 nm, such as less than about 400 nm, about 300 nm, about 200 nm, or about 100 nm. The metal layers and inorganic oxidizer layers can have the same or different thicknesses from each other in the stacks. In the stacks, the layers are preferably sized to achieve stoichiometric balance. The reactive thin films can typically have width and length dimensions of about 0.5 mm to about 5 mm, such as about 1 mm to about 2 mm.

In an exemplary embodiment of the multilayered reactive thin film 30, the first metal layer 34 and second metal layer 38 are formed from the same metal, and the first oxidizer layer 36 and the second oxidizer layer 40 are formed from the same inorganic oxidizer. In another exemplary embodiment of the multilayered reactive thin film 30, the first metal layer 34 is composed of a first metal, the second metal layer 38 is composed of a different second metal, and the first oxidizer layer 36 and second oxidizer layer 40 are composed of the same inorganic oxidizer, which is effective to react with the metal to burn. The metals can be selected to provide different reaction rates and/or different reaction energies. In another exemplary embodiment of the multilayered reactive thin film 30, the first metal layer 34 and the second metal layer 38 are composed of the same metal, and the first oxidizer layer 36 and second oxidizer layer 40 are composed of different inorganic oxidizers, which are effective to react with the metal to burn. In the different exemplary embodiments of the reactive thin film 30, this arrangement of metal and inorganic oxidizer layers can be repeated any desired number of times to produce a multilayered reactive thin film structure including additional layers.

In another exemplary embodiment, the reactive thin films include more than one metal layer between adjacent inorganic oxidizer layers, or more than one inorganic oxidizer layer between adjacent metal layers In another exemplary embodiment, the layers of the reactive thin films have a transition zone between adjacent layers. For example, a first layer (e.g., a metal layer) and an adjacent second layer (e.g., oxidizer layer) can have a gradient where the composition of the first layer decreases and the composition of the second layer increases as position within the layers changes from the first layer to the second layer. In other words, there is a compositional, transitional area between the species of the layers. Such first and second layers can be intermingled in the thickness of the transition zone.

The metal and oxidizer layers of the reactive thin films can be deposited on any suitable substrate material. For example, the substrate can be composed of a metal or other material that burns when the propellant is ignited. The substrate can have any suitable shape and size, such as a sheet. The substrate can be retained as part of the multilayered structure, or removed after forming the multiple layers on the substrate.

The metal layers of the reactive thin films can be deposited by any suitable deposition technique. For example, metal layers can be deposited by chemical vapor deposition (CVD), low-pressure chemical vapor deposition (LPCVD), plasma enhanced chemical vapor deposition (PECVD), sputtering, and the like. The deposition technique that is utilized to produce a particular structure can be selected based on the metal layer composition that is to be deposited.

The inorganic oxidizer can be deposited to form the reactive thin films by any suitable technique. For example, the inorganic oxidizer can be deposited by reactive sputtering, or sputtering with a target composed of the metal oxide.

In exemplary embodiments, one or more metal layers of the reactive thin films can contain hydrogen. For example, in the reactive thin film 30 shown in FIG. 2, the first metal layer 34 and/or the second metal layer 38 can contain hydrogen. The hydrogen contained in the first and second metal layers 34, 38 is released in gaseous form when the reactive thin film 30 is activated when the propellant is ignited. By containing hydrogen, the reactive thin films can produce a greater amount of heat when activated.

Hydrogen can be introduced into the metal layers using any suitable technique. For example, hydrogen can be introduced into metal layers of the reactive thin films by heating the metal layers in a high-temperature hydrogen atmosphere in a vessel, such that hydrogen diffuses into the metal layers, and optionally also into the substrate, depending on the substrate composition. The hydrogen can form metal hydrides, such as aluminum hydride.

In another exemplary embodiment, multilayered reactive thin films can be subjected to plasma hydrogenation to introduce hydrogen into one or more metal layers, preferably into all of the metal layers. Depending on the composition of the substrate, hydrogen can also be introduced into the substrate during the plasma hydrogenation treatment.

Utilization of reactive thin film (RTF) materials comprising small-scale layers of a metal with an inorganic oxidizer in place of all, or a portion, of a dispersed metal fuel can provide improved performance characteristics in the propellants. The ability to extract useful energy from a metal fuel in a rocket motor depends on the residence time of metal particles in the combustion chamber and on effective heat transfer into the gas that is produced. Accordingly, the faster a metal fuel burns in the combustion chamber, the more likely it is that the metal will be fully oxidized and transfer thermal energy into the gas prior to the gas exiting the rocket motor nozzle. Because the reactive thin films are self-oxidized and can be structured with fuel and inorganic oxidizer physically bonded together, kinetic limitations resulting from the residence time needed for a metal fuel particle to find available oxidizer can be reduced. In contrast to micron-sized metal particles dispersed in a matrix containing an oxidizer, the reactive thin films of the solid composite composites can be mixed at the micron scale, or the nanometer scale, with oxidizer. The reactive thin films do not require mass transport of oxidizing species from an oxidizer to diffuse to the surface of the burning metal particle. Consequently, the reactive thin films offer a more consistent burn than dispersed metal particles because the reactive thin films are less hindered by microscopic mass transport limitations. A more consistent burn results in the stabilization of the solid composite propellant burn rate. Also, the faster burning rate of reactive thin films as compared to such micron-sized metal powders results in more efficient extraction of energy from the rocket motor and a higher specific impulse from the propellant.

Ignition of reactive thin films can produce reaction products composed of extremely hot, fine particles of metal oxide, e.g., aluminum oxide, and a chemically-reduced metal that do not form molten pools, but rather are ejected away from the reacting film. Because the stoichiometry of the reactive thin films can be tailored to optimally react without mass transport of the propellant oxidizer to a metal fuel, the reaction releases the stored energy quickly, thereby providing a greater period of time to permit heat transfer from the metal/metal oxide reaction products to the work-producing propellant gas before ejection from the rocket nozzle. Furthermore, the smaller the reaction product particle size, the more the reaction products perform ideally in momentum transfer.

Cold temperature performance of a composite propellant containing the reactive thin film in place of all, or a portion, of a metal or metal compound fuel is expected to also improve because the burning propellant surface can be maintained at a hotter temperature with the consumption of reactive thin film as compared to a propellant more limited by fuel/oxidizer transport kinetics.

Utilizing reactive thin films in place of at least a portion of metal or metal compounds in a propellant matrix is expected to provide an overall increase in propellant volumetric energy density, and the creation of tradespace involving specific impulse, payload weight and payload range. Ultimately, by improving burn consistency and stabilizing the propellant burn rate, the rocket motor weight can be reduced, thereby increasing rocket motor efficiency and safety.

Accordingly, in the solid composite propellants, reactive thin films can provide advantages as compared to other metal fuels of the same composition, but of different forms, such as metal powders.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A method of making a solid composite propellant, comprising:
   forming a mixture comprising an energetic oxidizer, a binder and a multi-layered reactive thin film, the reactive thin film comprising at least a first metal layer and a first inorganic oxidizer layer adjacent the first metal layer; and
   solidifying the mixture to form a solid composite propellant comprising the reactive thin film dispersed in a matrix of the binder and the energetic oxidizer.

2. The method of claim 1, wherein the reactive thin film further comprises:
   a second metal layer adjacent the first inorganic oxidizer layer; and
   a second inorganic oxidizer layer adjacent the second metal layer.

3. The method of claim 1, wherein:
   the first metal layer of the reactive thin film is composed of a metal selected from the group consisting of aluminum, beryllium, zirconium, titanium, boron, magnesium, and combinations thereof; and
   the first inorganic oxide layer of the reactive thin film is composed of at least one oxide selected from group consisting of $La_2O_3$, $AgO$, $ThO_2$, $SrO$, $ZrO_2$, $UO_2$, $BaO$, $CeO_2$, $B_2O_3$, $SiO_2$, $V_2O_5$, $Ta_2O_5$, $NiO$, $Ni_2O_3$, $Cr_2O_3$, $MoO_3$, $P_2O5$, $SnO_2$, $WO_2$, $WO_3$, $Fe_3O_4$, $MoO_3$, $NiO$, $CoO$, $Co_3O_4$, $Sb_2O_3$, $PbO$, $Fe_2O_3$, $Bi_2O_3$, $MnO_2$, $Cu_2O$ and $CuO$.

4. The method claim 1, wherein the mixture further comprises a metal powder.

5. The method of claim 1, wherein the first metal layer or the first inorganic oxidizer layer is formed on a substrate.

6. The method of claim 1, further comprising introducing hydrogen into the first metal layer.

7. The method of claim 2, further comprising introducing hydrogen into the first metal layer and the second metal layer.

8. The method of claim 5, wherein:
   the substrate is composed of a metal; and
   further comprising introducing hydrogen into the substrate and the first metal layer.

9. The method of claim 1, wherein each of the first metal layer and the first inorganic oxidizer layer has a thickness of less than about 500 nm.

10. The method of claim 1, wherein the mixture comprises about 1 to about 35 wt. % of the reactive thin film.

11. The method of claim 1, wherein the reactive thin film comprises a plurality of additional metal layers and inorganic oxide layers arranged in an alternating stacked arrangement on the first metal layer or the first inorganic oxide layer.

12. The method of claim 11, further comprising introducing hydrogen into the first metal layer and the additional metal layers.

13. The method of claim 1, further comprising:
   placing the mixture into a combustion chamber of a rocket motor; and
   solidifying the mixture in the combustion chamber.

* * * * *